US010602721B2

(12) United States Patent
Lenger

(10) Patent No.: US 10,602,721 B2
(45) Date of Patent: Mar. 31, 2020

(54) ANIMAL FECES REMOVAL DEVICE

(71) Applicant: Lance Lenger, Columbia, MO (US)

(72) Inventor: Lance Lenger, Columbia, MO (US)

(73) Assignee: Lance Lenger, Columbia, MO (US)

( * ) Notice: Subject to any disclaimer, the term of this patent is extended or adjusted under 35 U.S.C. 154(b) by 321 days.

(21) Appl. No.: 15/631,939

(22) Filed: Jun. 23, 2017

(65) Prior Publication Data

US 2018/0368370 A1   Dec. 27, 2018

(51) Int. Cl.
*A01K 23/00* (2006.01)
*E01H 1/12* (2006.01)

(52) U.S. Cl.
CPC ......... *A01K 23/005* (2013.01); *E01H 1/1206* (2013.01)

(58) Field of Classification Search
CPC .................................................. A01K 23/005
See application file for complete search history.

(56) References Cited

U.S. PATENT DOCUMENTS

| 3,446,525 | A | * | 5/1969 | Jones | E01H 1/1206 |
| | | | | | 294/1.4 |
| 4,097,082 | A | * | 6/1978 | Orofino | E01H 1/1206 |
| | | | | | 294/1.4 |
| 4,179,145 | A | * | 12/1979 | Shinsako | E01H 1/1206 |
| | | | | | 294/1.4 |
| 4,210,351 | A | * | 7/1980 | Orofino | E01H 1/1206 |
| | | | | | 294/1.4 |
| 4,286,816 | A | * | 9/1981 | Tobias | E01H 1/1206 |
| | | | | | 294/1.4 |
| 4,819,977 | A | * | 4/1989 | Cooper | E01H 1/1206 |
| | | | | | 294/1.4 |
| 5,142,123 | A | | 8/1992 | Chou | |
| 5,295,721 | A | * | 3/1994 | Wu | E01H 1/1206 |
| | | | | | 15/257.6 |
| 5,628,537 | A | * | 5/1997 | Kiemer | E01H 1/1206 |
| | | | | | 294/1.4 |
| 5,669,645 | A | * | 9/1997 | Chuang | E01H 1/1206 |
| | | | | | 294/1.3 |
| 6,059,333 | A | * | 5/2000 | De Toma | E01H 1/1206 |
| | | | | | 294/1.3 |
| 6,196,601 | B1 | * | 3/2001 | Juntunen, Jr. | E01H 1/1206 |
| | | | | | 294/1.4 |
| 7,198,310 | B1 | * | 4/2007 | Lau | A01K 23/005 |
| | | | | | 294/1.5 |

(Continued)

*Primary Examiner* — Michael H Wang
(74) *Attorney, Agent, or Firm* — Stinson LLP

(57) ABSTRACT

Embodiments of the disclosure enable a user to remove animal feces in a sanitary manner. An animal feces removal device includes a claw housing defining a distal opening, a claw assembly including a plurality of fingers movable between a closed configuration and an open configuration, a shaft assembly including a projection member movable between a retracted configuration and an extended configuration, and a bag assembly including a frame member and one or more bags removably coupled to the frame member. The projection member is coupled to the claw assembly such that the fingers move as the projection member is moved. A first bag is positionable adjacent to the distal opening such that, when the fingers move from the retracted position toward the extended position, the first bag is uncoupled from the frame member for use in picking up animal feces.

19 Claims, 10 Drawing Sheets

(56) References Cited

U.S. PATENT DOCUMENTS

| | | | |
|---|---|---|---|
| 7,226,098 B1 * | 6/2007 | Moreira | E01H 1/1206 294/1.4 |
| 7,331,077 B1 | 2/2008 | Henry | |
| 7,448,659 B1 * | 11/2008 | Auseklis | E01H 1/1206 294/1.4 |
| 7,523,972 B1 * | 4/2009 | Wawrzynowski | E01H 1/1206 294/1.3 |
| 8,146,967 B1 * | 4/2012 | Brown | A01K 23/005 294/1.5 |
| 8,196,980 B1 * | 6/2012 | Banks | A01K 23/005 294/1.3 |
| 8,292,339 B1 * | 10/2012 | Auseklis | E01H 1/1206 294/1.4 |
| 8,408,615 B1 * | 4/2013 | Patel | E01H 1/1206 294/1.4 |
| 8,899,643 B2 * | 12/2014 | Sigmund | A01K 27/004 294/1.3 |
| 9,187,871 B1 * | 11/2015 | Contreras | E01H 1/1206 |
| 9,854,787 B1 * | 1/2018 | Hayes | A01K 23/005 |
| 2002/0194772 A1 * | 12/2002 | Akhtar | A01K 23/005 43/107 |
| 2004/0135386 A1 * | 7/2004 | Pineda | E01H 1/1206 294/1.4 |
| 2007/0024070 A1 * | 2/2007 | Aihiokhai | E01H 1/0845 294/1.4 |
| 2008/0061569 A1 * | 3/2008 | Bowes | E01H 1/1206 294/1.3 |
| 2009/0200812 A1 * | 8/2009 | Mambru | E01H 1/1206 294/1.4 |
| 2010/0176611 A1 * | 7/2010 | Merino-Garcia | E01H 1/1206 294/1.3 |
| 2011/0057463 A1 * | 3/2011 | Chen | A01K 23/005 294/1.4 |
| 2012/0256430 A1 * | 10/2012 | Merino-Garcia | E01H 1/1206 294/1.3 |
| 2014/0152031 A1 * | 6/2014 | Ballacchino | E01H 1/1206 294/1.3 |
| 2014/0152033 A1 * | 6/2014 | Wilson | E01H 1/1206 294/1.4 |
| 2015/0167264 A1 * | 6/2015 | Naseem | E01H 1/1206 294/1.4 |
| 2017/0159254 A1 * | 6/2017 | Gordon | E01H 1/1206 |
| 2017/0339921 A1 * | 11/2017 | Castano | E01H 1/1206 |

* cited by examiner

ANIMAL FECES REMOVAL DEVICE

BACKGROUND

At least some feces left by animals may be picked up by their owners. For example, some animal owners may remove the feces from a property and transport the feces to a suitable depository to comply with a local law or ordinance. Some methods and systems for picking up, transporting, and disposing feces, however, are unsanitary. In an effort to make the feces-removal experience more sanitary, at least some animal owners may use a wrapper or bag. Known methods and systems for using a bag to pick up, transport, and/or dispose feces, however, allow some element other than the bag to come into contact with the feces, which would itself need to be cleaned and/or result in a contaminated surface being exposed, thereby compromising the cleanliness of the feces-removal experience. For example, the animal owner may touch the mouth of the bag, which may have come into contact with the feces, to tie up or close the bag.

SUMMARY

Embodiments of the disclosure enable a user to remove animal feces in a sanitary manner. An animal feces removal device includes a claw housing, a claw assembly, a shaft assembly, and a bag assembly. The claw housing defines a claw cavity and a distal opening that provides access to the claw cavity. The claw assembly includes a plurality of fingers and a claw actuator configured to move the fingers between a closed configuration and an open configuration. The fingers are positionable within the claw cavity. The shaft assembly includes a projection member movable between a retracted configuration and an extended configuration. The projection member is coupled to the claw assembly such that the fingers move between a retracted position and an extended position as the projection member is moved between the retracted configuration and the extended configuration. The bag assembly includes a frame member and one or more bags removably coupled to the frame member. A first bag is positionable adjacent to the distal opening such that, when the fingers move from the retracted position toward the extended position, the first bag is uncoupled from the frame member for use in picking up animal feces.

In another aspect, a control system for use in removing animal feces is provided. The control system includes a memory device storing computer-executable instructions, and a processor configured to execute the computer-executable instructions to rotate a projection reel in a first direction to move a projection member extended about the projection reel from a retracted configuration toward an extended configuration. The projection member is coupled to a claw assembly such that a plurality of fingers of the claw assembly move from a retracted position toward an extended position as the projection member is moved from the retracted configuration toward the extended configuration. The processor is further configured to execute the computer-executable instructions to move the fingers from a closed configuration toward an open configuration, move the fingers from the open configuration toward the closed configuration, and rotate the projection reel in a second direction opposite the first direction to move the projection member from the extended configuration toward the retracted configuration.

In yet another aspect, a method is provided for using animal feces removal device to handle an object. The method includes moving a projection member of a shaft assembly toward an extended configuration. The projection member is coupled to a claw assembly such that a plurality of fingers of the claw assembly move toward an extended position as the projection member is moved toward the extended configuration. The fingers are moved toward an open configuration and are movable toward the object in the open configuration to at least partially surround the object. The fingers are moved toward a closed configuration to control the object. The projection member is moved toward a retracted configuration such that the fingers move toward a retracted position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

The subject matter described herein relates generally to pick up devices and, more specifically, to systems and methods for the sanitary removal of animal feces. Embodiments of the disclosure enable a user to pick up, transport, and/or dispose an object, such as animal feces, in a sanitary manner. For example, the examples described herein allow a user to pick up, transport, and/or dispose animal feces without coming into direct contact with the animal feces itself or with a surface that touched or potentially touched the animal feces.

An animal feces removal device may include a frame member including a plurality of bags removably coupled to the frame member. A claw assembly may remove a bag from the frame member and use the bag when approaching and controlling an object. The bag may be used, for example, to collect the object. A seal assembly may seal the bag before the claw assembly releases the object, and another bag may be selectively positioned for use in approaching and controlling another object. In this manner, a disposable bag may be used to pick up, transport, and/or dispose of animal feces in an efficient, effective, and sanitary manner without any other surfaces of the animal feces removal device coming into direct contact with the animal feces.

The systems and processes described herein may be implemented using computer programming or engineering techniques including computer software, firmware, hardware, or a combination or subset thereof. While the examples described herein are described in regard to animal feces, it should be understood that the examples described herein may be used to pick up, transport, and/or dispose other objects in the same manner as described herein with respect to animal feces without departing from the present disclosure.

The technical effect of the systems and processes described herein is achieved by performing at least one of the following operations: a) rotate a projection reel to move a projection member toward an extended configuration; b) move a plurality of fingers toward an open configuration; c) move the fingers toward a closed configuration; d) rotate the projection reel to move the projection member toward a retracted configuration; e) determine whether the fingers are in the retracted position; f) rotate one or more frame gears to move one or more surfaces of a seal assembly toward a closed position; g) activate a heat element of the seal assembly; h) rotate the frame gears to move the surfaces of the seal assembly toward an open position; and/or i) rotate one or more frame reels to move at least a segment of a frame member.

Figure 1:
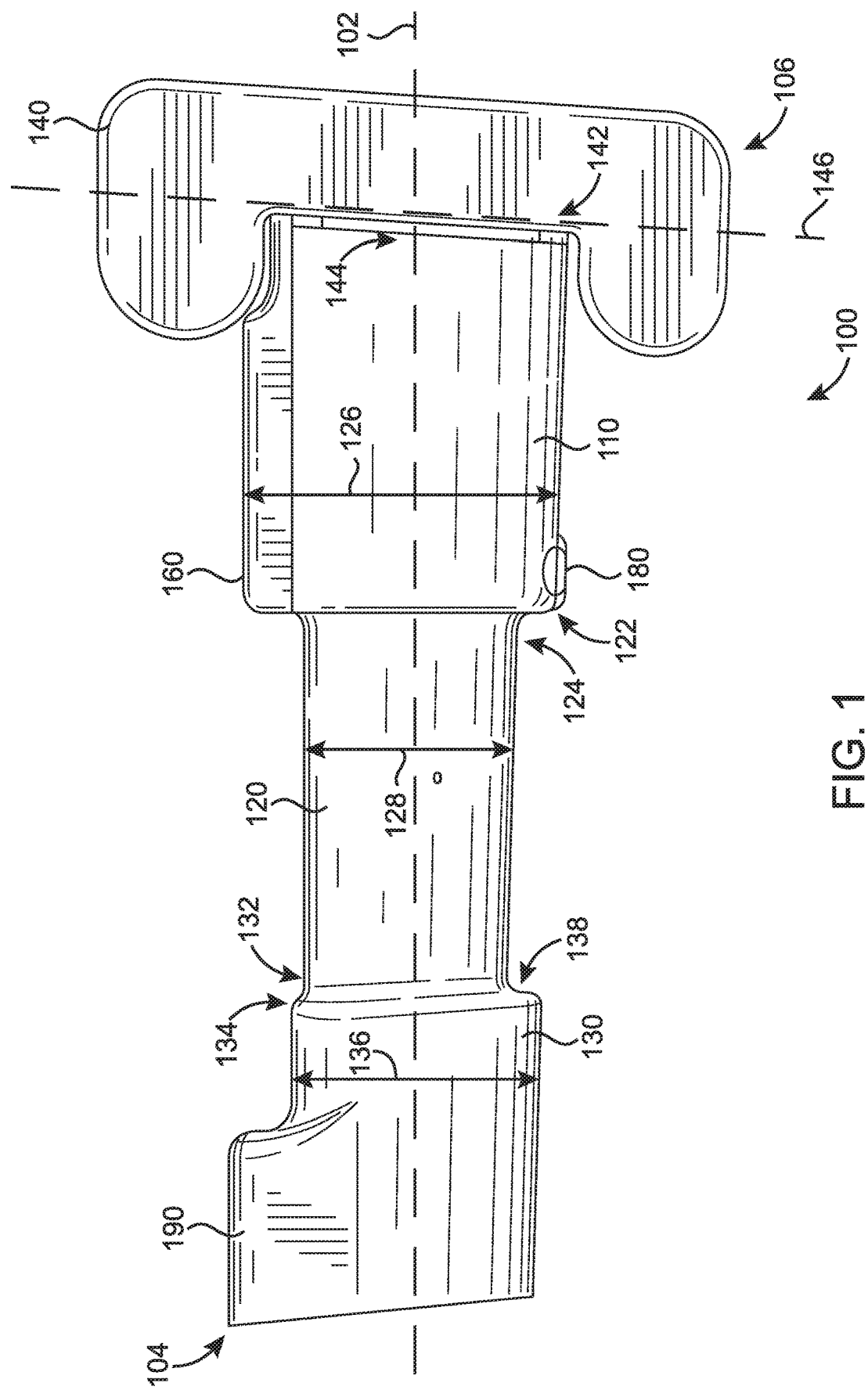
FIG. 1 is a side view of an example animal feces removal device.

FIG. 1 shows an example animal feces removal device 100 for removing objects, such as animal feces, in a sanitary manner. The components of the animal feces removal device 100 may be made out of plastic, metal, carbon fiber, or any other suitable material as known in the art. The animal feces removal device 100 extends substantially along a longitudinal axis 102 between a proximal end 104 and a distal end 106. The animal feces removal device 100 includes a claw housing 110 and a handle 120 coupled to the claw housing 110. A proximal end portion 122 of the claw housing 110, for example, may be coupled to a distal end portion 124 of the handle 120. In some examples, the claw housing 110 has a first outer diameter 126, and the handle 120 has a second outer diameter 128 smaller than the first outer diameter 126. The second outer diameter 128 may be sized, for example, to allow a user to comfortably grasp the handle 120 when using the animal feces removal device 100. In this manner, the user may grasp the handle 120 to lift the animal feces removal device 100 and position the distal end 106 proximate to an object (e.g., animal feces) to collect the object and then, after the object is picked up, position the distal end 106 proximate to a suitable depository or receptacle to release the object.

In some examples, the animal feces removal device 100 includes a knob portion 130 coupled to the handle 120 opposite the claw housing 110. A proximal end portion 132 of the handle 120, for example, may be coupled to a distal end portion 134 of the knob portion 130. In some examples, the knob portion 130 has a third outer diameter 136 larger than the second outer diameter 128. In this manner, the distal end portion 134 has a surface 138 that, when the handle 120 is grasped by the user, may come into contact with a proximal end portion of the user's hand and/or at least partially restrict the user's hand from moving generally in a proximal direction (i.e., toward the proximal end 104).

In some examples, the animal feces removal device 100 includes a bag assembly 140 coupled to the claw housing 110. A proximal end portion 142 of the bag assembly 140, for example, may be coupled to a distal end portion 144 of the claw housing 110. The bag assembly 140 extends generally across the distal end portion 144 of the claw housing 110 substantially along a lateral axis 146 perpendicular to the longitudinal axis 102. The bag assembly 140 includes one or more bags 150 (shown in FIG. 5 that may be used to pick up, transport, and/or dispose one or more objects (e.g., animal feces) in a sanitary manner. The bags 150 may be fabricated, for example, from a flexible, durable, and/or impervious material that enables the bags 150 to be wrapped at least partially around the objects and sealed such that the objects and associated solids, liquids, gases, and/or microorganisms are contained therein.

The animal feces removal device 100 includes a control housing 160 and a control system 170 (shown in FIG. 9) positioned in the control housing 160. In some examples, the control housing 160 and/or control system 170 is coupled to and/or included in the claw housing 110. Alternatively, the control housing 160 and/or control system 170 may be coupled to and/or included in any component of the animal feces removal device 100 that enables the animal feces removal device 100 to function as described herein.

The control system 170 is configured to control or operate the animal feces removal device 100, as described in detail below. The control system 170 may be, for example, a computing system communicatively coupled to various components of the animal feces removal device 100. In some examples, the animal feces removal device 100 includes a user interface 180 that enables the user to enter one or more commands and/or provide information to the control system 170 for use in operating the animal feces removal device 100. The user interface 180 may be, for example, a button or a joystick. In some examples, the user interface 180 is at or adjacent to the proximal end portion 122 of the claw housing 110 to enable the user to position his or her thumb adjacent to or on the user interface 180 in a manner that allows the user to interact with the user interface 180 while grasping the handle 120. Alternatively, the user interface 180 may be coupled to and/or included in any portion of the animal feces removal device 100 that the control system 170 to function as described herein.

In some examples, the animal feces removal device 100 includes a power housing 190 and a power source (not shown) stored therein. The power source supplies or provides electric power to the control system 170, user interface 180, and/or any other component of the animal feces removal device 100 that consumes electric power. The power source may include, for example, a primary battery or a secondary battery, such as an alkaline battery, a zinc-carbon battery, a zinc-chloride battery, a zinc-air battery, a nickel zinc battery, a nickel-cadmium battery, a nickel-metal hydride battery, a nickel oxyhydroxide battery, a lithium battery, a lithium ion battery, a lithium-polymer battery, a silver-zinc battery, a silver-oxide battery, a magnesium battery, an aluminum-air battery, and the like. Alternatively, the animal feces removal device 100 may be powered using any power source that enables the animal feces removal device 100 to function as described herein. The power housing 190 and/or power source may be coupled to and/or included in any portion of the animal feces removal device 100 that enables the animal feces removal device 100 to function as described herein. For example, the power housing 190 and/or power source may be coupled to and/or included in the knob portion 130. Alternatively, the animal feces removal device 100 may be coupled to an external power source.

Figure 2:
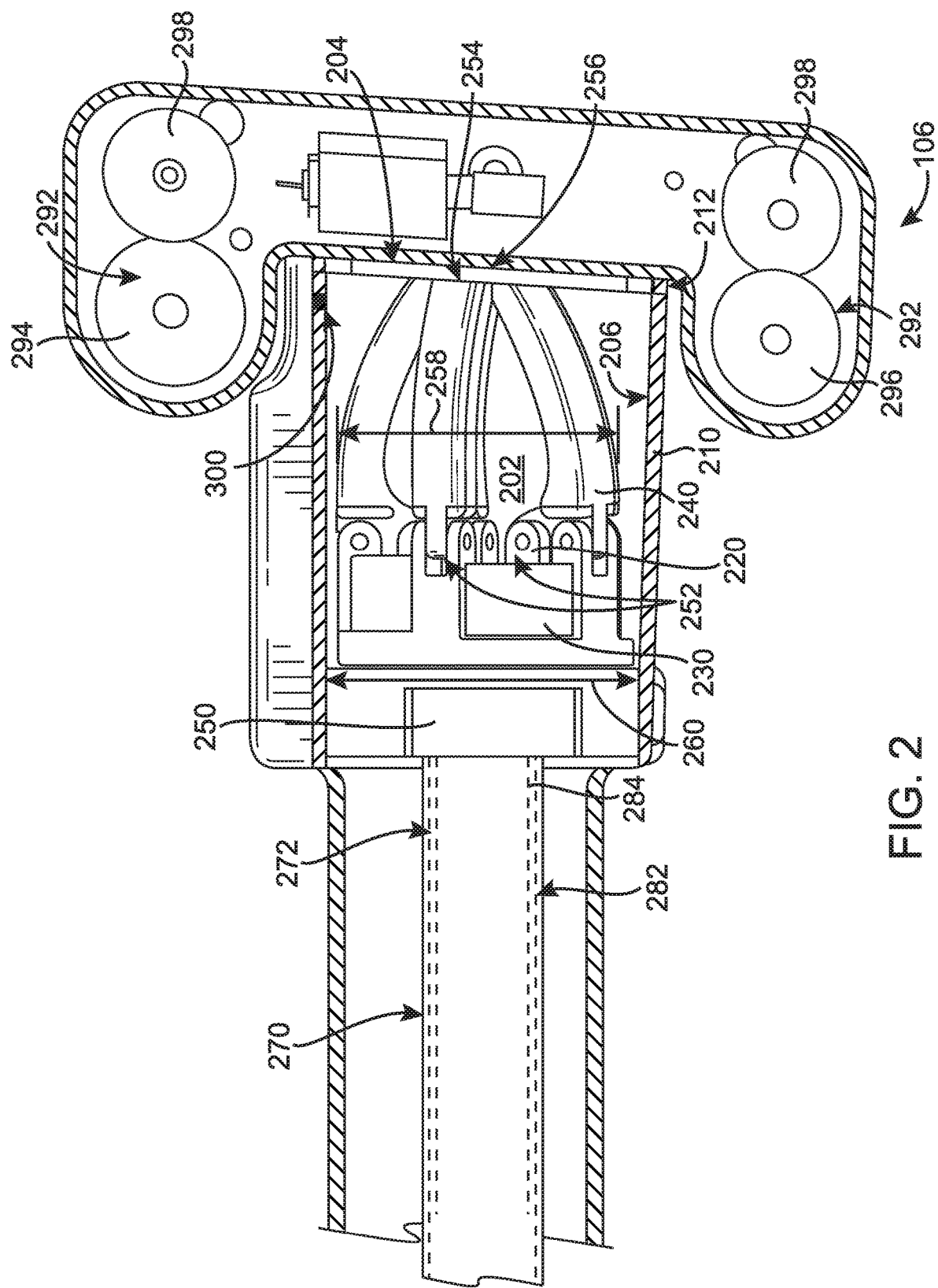
FIG. 2 is a partial sectional view of an example distal end of an animal feces removal device, such as the animal feces removal device shown in FIG. 1, in a closed, retracted configuration.
Figure 3:
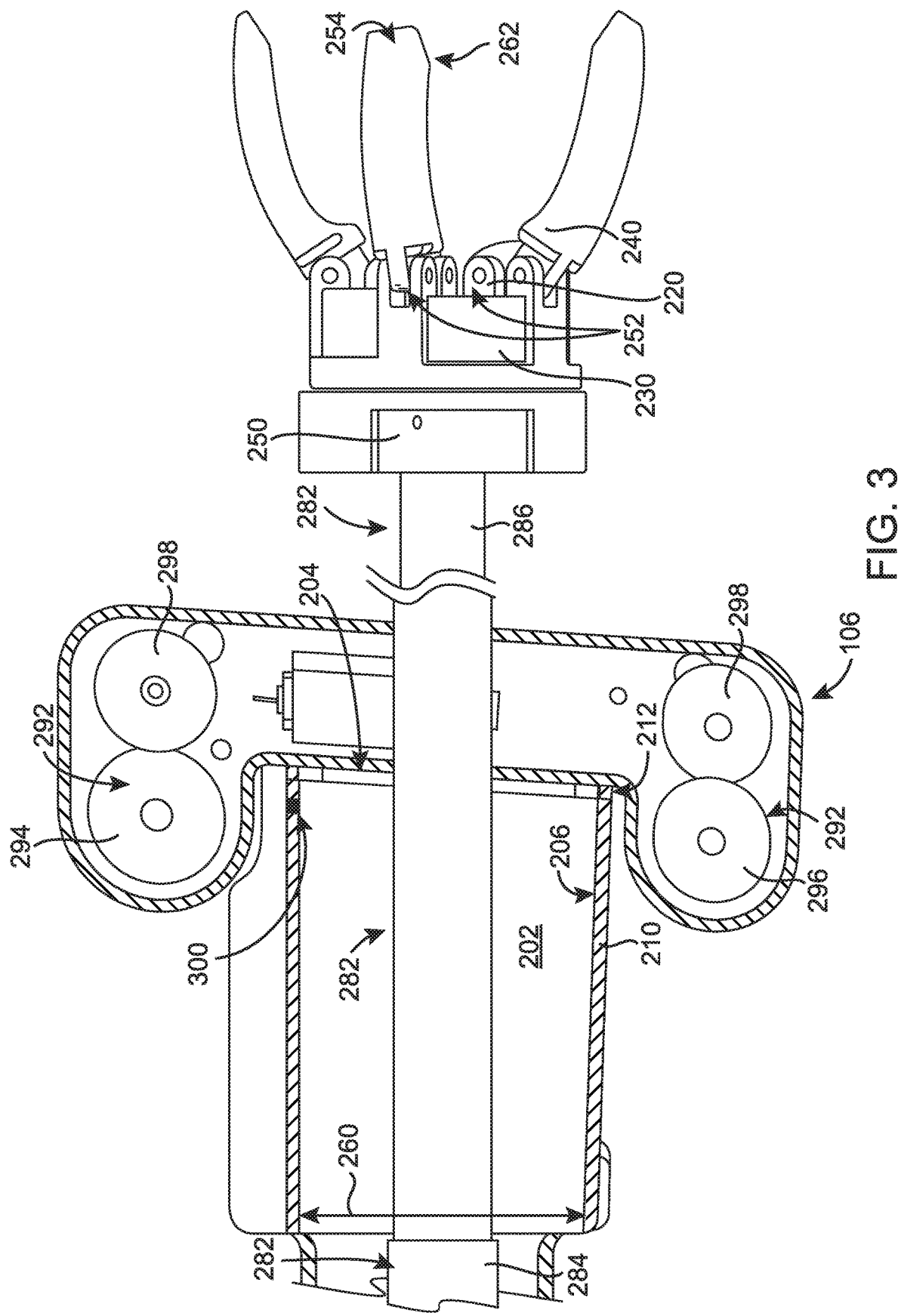
FIG. 3 is a partial sectional view of an example distal end of an animal feces removal device, such as the animal feces removal device shown in FIG. 1, in an open, extended configuration.

FIG. 2 shows a distal end 106 of the animal feces removal device 100 in a closed, retracted configuration, and FIG. 3 shows the distal end 106 of the animal feces removal device 100 in an open, extended configuration. The claw housing 110 defines a claw cavity 202 and a distal opening 204 that provides access to the claw cavity 202. The claw cavity 202 may be defined, for example, by an inner surface 206 of a sidewall 210 of the claw housing 110, and the distal opening 204 may be defined by a distal end portion 212 of the inner surface 206.

The animal feces removal device 100 includes a claw assembly 220 positionable in the claw cavity 202. The claw assembly 220 may be used, for example, to collect an object (e.g., animal feces). In some examples, the claw assembly 220 includes a base 230, a plurality of fingers 240 coupled to the base 230, and a claw actuator 250 configured to move the fingers 240 between the closed configuration (shown in FIG. 2) and the open configuration (shown in FIG. 3). The fingers 240 are movable generally in a radial direction toward and/or away from the longitudinal axis 102. For example, each finger 240 may pivot at a respective joint 252 about a respective axis tangent to a circle passing through the joints 252. The claw assembly 220 made fabricated from a plastic material, a metal material, a carbon fiber material, and/or any other material that enables the claw assembly 220 to collect an object. Moreover, while described herein as including fingers 240, the claw assembly 220 may have any other configuration that enables the claw assembly 220 to collect an object.

In some examples, the fingers 240 move generally in unison and are substantially identical in size and shape. In this manner, distal end portions 254 of the fingers 240 may converge toward a pinch point 256 when moving toward the closed configuration and diverge from the pinch point 256 when moving toward the open configuration. In the closed configuration, the distal end portions 254 of the fingers 240 are generally at or adjacent to the pinch point 256 such that the fingers 240 are positioned to collect an object. Additionally, in the closed configuration, an outer diameter 258 (shown in FIG. 2) of the fingers 240 is smaller than an inner diameter 260 of the sidewall 210 such that the fingers 240 are positionable within the claw cavity 202. In the open configuration, the distal end portions 254 of the fingers 240 are remote from the pinch point 256 such that there is space 262 (shown in FIG. 3) between the distal end portions 254 for receiving and/or releasing an object.

Additionally, the fingers 240 are movable generally in a longitudinal direction between a retracted position (shown in FIG. 2) and an extended position (shown in FIG. 3). The bag assembly 140 is configured to position one or more bags 150 (shown in FIG. 5) relative to the fingers 240 such that, when the fingers 240 are moved from the retracted position and toward the extended position, at least one of the bags 150 are usable to collect one or more objects (e.g., animal feces). In some examples, the animal feces removal device 100 includes a shaft assembly 270 configured to move the fingers 240 between the retracted position and the extended position. In the retracted position, the fingers 240 are within the claw cavity 202. In the extended position, at least a portion of the fingers 240 (e.g., the distal end portions 254) are outside the claw cavity 202 (i.e., on a distal side of the distal opening 204). In this manner, the bag assembly 140 may position the bags 150 adjacent to the distal opening 204.

In some examples, the shaft assembly 270 includes a shaft housing 272 defining a channel therein, and a projection member 280 (shown in FIG. 4) extending through the channel. The channel may be defined, for example, by one or more inner surfaces of the shaft housing 272. The shaft housing 272 may be a telescoping body including a plurality of segments 282. The segments 282 may include, for example, a proximal segment 284 and one or more segments other than the proximal segment 284, including a distal segment 286 (shown in FIG. 4), that are movable relative to the proximal segment 284. The shaft housing 272 may include any quantity of segments 282 between the proximal segment 284 and the distal segment 286, including zero, that enables the shaft assembly 270 to function as described herein. For example, the shaft housing 272 may include one or more segments 282 that are slidably coupled to another segment 282, including the proximal segment 284 and/or the distal segment 286. Alternatively, the proximal segment 284 may be directly coupled to the distal segment 286.

The shaft housing 272 is coupled to the claw housing 110, handle 120, claw assembly 220, and/or projection member 280 such that the shaft housing 272 is movable between the retracted configuration (shown in FIG. 2) and the extended configuration (shown in FIG. 3). The proximal segment 284 may be coupled to the claw housing 110 and/or handle 120, for example, such that the proximal segment 284 is generally stationary (e.g., does not move) along the longitudinal axis 102 relative to the claw housing 110 and/or handle 120. Moreover, the distal segment 286 may be coupled to the base 230 of the claw assembly 220 and/or the distal end portion 286 of the projection member 280, for example, such that the distal segment 286 is movable along the longitudinal axis 102 relative to the claw housing 110 and/or handle 120 between the retracted position (shown in FIG. 2) and the extended position (shown in FIG. 3) as the projection member 280 is moved between the retracted configuration and the extended configuration. In this manner, the shaft housing 272 may move between the retracted configuration and the extended configuration as the projection member 280 is moved between the retracted configuration and the extended configuration. In the retracted configuration, the distal segment 286 is in the retracted position and on a proximal side of the distal opening 204 (e.g., within the claw cavity 202). In the extended configuration, the distal segment 286 is in the extended position and on a distal side of the distal opening 204 (e.g., outside the claw cavity 202).

The bag assembly 140 includes one or more frame reels 292 rotatable to selectively position the bags 150 adjacent to the distal opening 204, as described in detail below. The frame reels 292 are adjacent to the distal opening 204 and generally stationary (e.g., does not move) along the longitudinal axis 102 and/or lateral axis 146 relative to the claw housing 110 and/or distal opening 204. The frame reels 292 may include, for example, a first frame reel 294 on one side of the distal opening 204 and a second frame reel 296 on an opposing side of the distal opening 204. In some examples, the bag assembly 140 includes one or more bag actuators 298 configured to rotate the first frame reel 294 and/or second frame reel 296 such that a first bag 150 is selectively positioned adjacent to the distal opening 204 between the first frame reel 294 and the second frame reel 296.

In some examples, a sensor system 300 determines whether the fingers 240 are positioned within the claw cavity 202. The sensor system 300 may include, for example, one or more optical sensors, pressure sensors, proximity sensors, motion sensors, and the like. The sensor system 300 may be positioned and/or oriented to detect one or more objects proximate to the distal end portion 212 of the inner surface 206. In this manner, the sensor system 300 may identify the fingers 240 as being positioned within the claw cavity 202 when an object proximate to the distal end portion 212 is detected. Additionally or alternatively, the sensor system 300 may be positioned and/or oriented to detect one or more objects extending through the distal opening 204 and identify the fingers 240 as being positioned within the claw cavity 202 when no object extending through the distal opening 204 is detected.

While FIG. 2 shows the animal feces removal device 100 with the fingers 240 in a closed configuration and in the retracted position and FIG. 3 shows the animal feces device 100 with the fingers 240 in an open configuration and in an extended position, the fingers 240 may be in any combination of configurations and/or positions that enables the animal feces removal device 100 to function as described herein. For example, the fingers 240 may be in the closed configuration and in a position other than the retracted position (e.g., when the fingers 240 are being deployed to collect an object) and/or in a configuration other than the closed configuration and in a position other than the extended position (e.g., when the fingers 240 are releasing an object).

Figure 4:
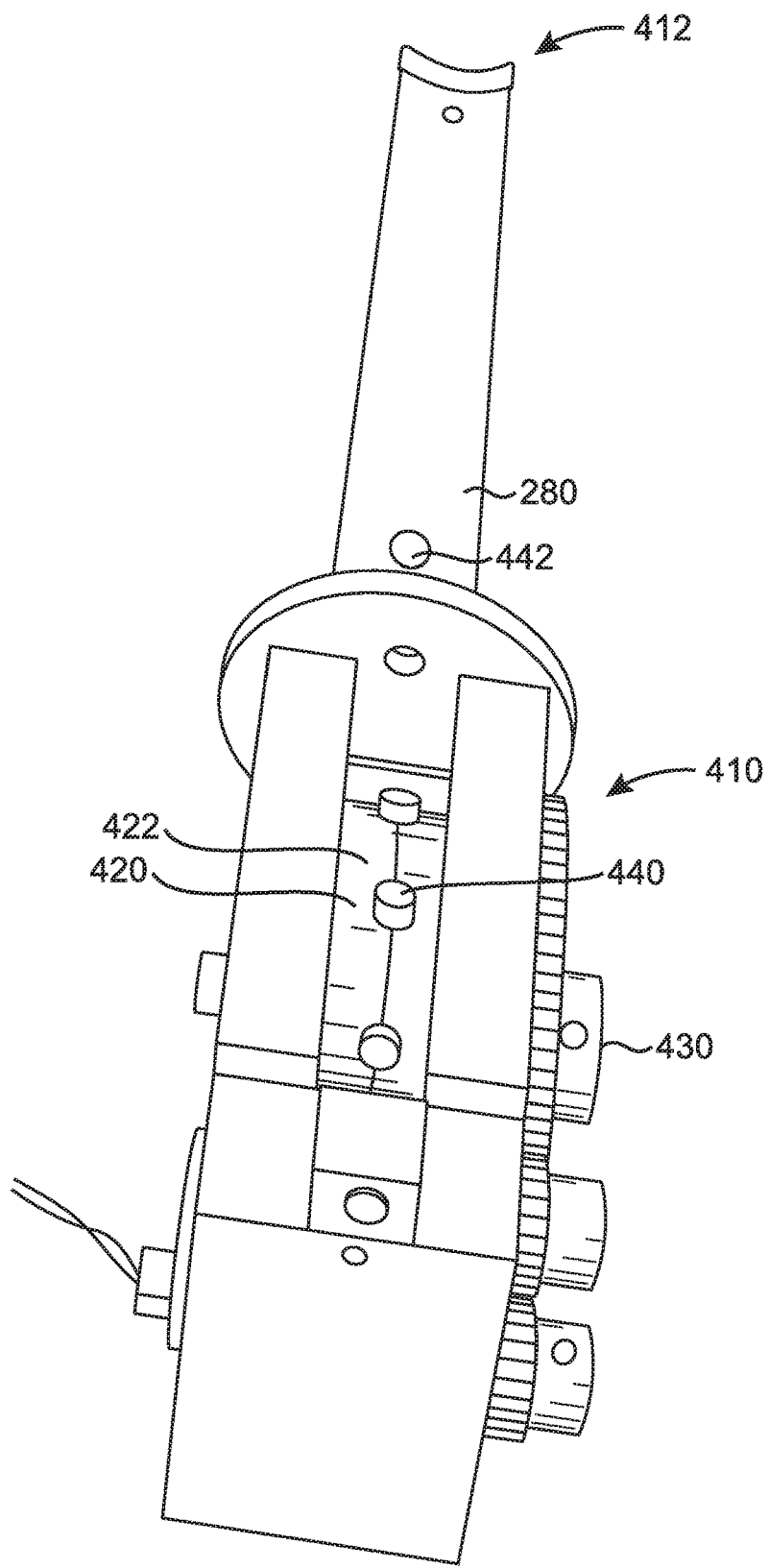
FIG. 4 is a perspective view of an example shaft assembly that may be used with an animal feces removal device, such as the animal feces removal device shown in FIG. 1.

FIG. 4 shows a shaft assembly 270 including a projection member 280 and a shaft actuator 410 configured to move the projection member 280 between the retracted configuration and the extended configuration. The projection member 280 is movable between a retracted configuration and an extended configuration. A distal end portion 412 of the projection member 280, for example, may be coupled to a proximal end portion of the claw assembly 220 (e.g., base 230) such that the fingers 240 move between the retracted position and the extended position as the projection member 280 is moved between the retracted configuration and the extended configuration.

In some examples, the shaft assembly 270 includes a projection reel 420 coupled to the shaft actuator 410. The projection reel 420 is coupled to the claw housing 110 and/or handle 120 such that the projection reel 420 is generally stationary (e.g., does not move) along the longitudinal axis 102 relative to the claw housing 110 and/or handle 120. The projection member 280 is extendable about the projection reel 420 such that a rotation of the projection reel 420 moves the projection member 280 between the retracted configuration and the extended configuration. A root portion of the projection member 280, for example, may be coupled to the projection reel 420 such that a rotational force on the projection reel 420 in a first (e.g., counterclockwise) direction urges or forces the projection member 280 toward the retracted configuration and a rotational force on the projection reel 420 in a second (e.g., clockwise) direction urges or forces the projection member 280 toward the extended configuration.

In the retracted configuration, the distal end portion 286 of the projection member 280 is on a proximal side of the distal opening 204 (e.g., within the claw cavity 202) and a body portion 422 of the projection member 280 between the root portion and the distal end portion 286 extends at least partially about the projection reel 420. In the extended configuration, the distal end portion 286 is on a distal side of the distal opening 204 (e.g., outside the claw cavity 202) and only a segment of the body portion 422 proximate to the root portion extends at least partially about the projection reel 420. That is, another segment of the body portion 422 proximate to the distal end portion 286 does not extend about the projection reel 420 when the projection member 280 is in the extended configuration, but rather extends in a longitudinal direction from the projection reel 420.

The projection reel 420 may include a hub 430 and one or more stems 440 extending radially outward from the hub 430. The stems 440 may be circumferentially spaced about the hub 430 at regular intervals. The projection member 280 may define a plurality of openings 442 corresponding to the stems 440. The openings 442 may be sized, for example, to receive the stems 440 and spaced along the projection member 280 such that the openings 442 are generally aligned with the stems 440 as the projection member 280 is extended about the projection reel 420.

Figure 5:
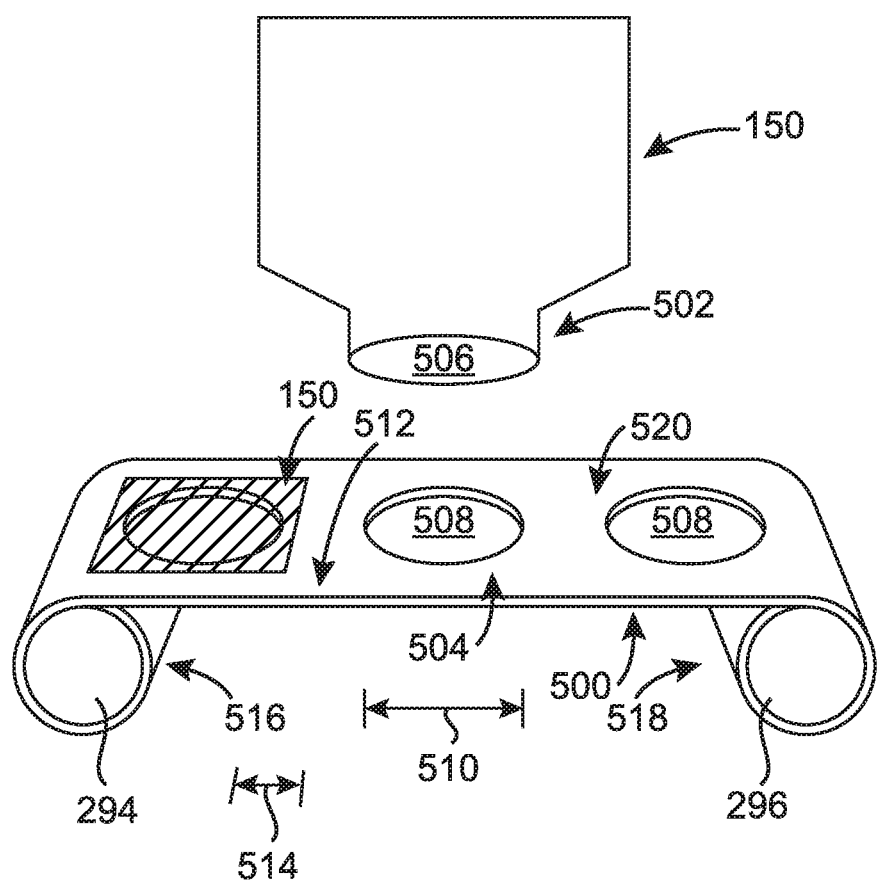
FIG. 5 is a perspective view of a frame member that may be used with an animal feces removal device, such as the animal feces removal device shown in FIG. 1.

FIG. 5 shows a frame member 500 that may be used with the bag assembly 140. One or more bags 150 may be removably coupled to the frame member 500. A mouth portion 502 of a bag 150, for example, may be coupled to an edge portion 504 of the frame member 500 such that a bag opening 506 defined by the mouth portion 502 is generally aligned with a frame opening 508 defined by the edge portion 504. An inner diameter 510 of the edge portion 504 is larger than the outer diameter 258 of the fingers 244 when the fingers 244 are in the closed configuration such that the fingers 244 are configured to pass through the frame opening 508.

In some examples, at least a segment of the frame member 500 extends substantially along the lateral axis 146 and generally parallel to the distal end portion 144 of the claw housing 110 (e.g., across the distal opening 204 of the claw housing 110 when viewed along the longitudinal axis 102) such that a first surface of the frame member 500 (facing away from the viewer) is oriented to face a proximal direction (e.g., toward the claw housing 110) and a second surface 512 of the frame member 500 is oriented to face a distal direction (e.g., away from the claw housing 110). The frame member 500 may be positioned, for example, such that a bag opening 506 and/or frame opening 508 are generally aligned with the distal opening 204 of the claw housing 110 (e.g., the distal opening 204, bag opening 506, and frame opening 508 are coaxially aligned with the longitudinal axis 102). In this manner, when moving from within the claw cavity 202 toward the extended position, the fingers 240 may move through the frame opening 508 to come into contact with a bag 150 (e.g., a first bag) and urge or force the bag 150 longitudinally in a distal direction such that the bag 150 detaches or uncouples from the frame member 500. Additionally, when moving from outside the claw cavity 202 toward the retracted position, the edge portions 504 may restrict at least a portion of the bag 150 extending beyond the inner diameter 510 of the edge portion 504 from moving through the frame opening 508.

In some examples, the frame member 500 includes one or more edge portions 504 spaced at predetermined intervals such that a predetermined distance 514 is between adjacent frame openings 508. The frame member 500 may be moved to selectively position a bag opening 506 and/or frame opening 508 such that a corresponding bag 150 is coaxially aligned with the distal opening 204. In this manner, after a bag 150 (e.g., a first bag) is used or consumed (e.g., uncoupled from the frame member 500 and/or disposed), the frame member 500 may be moved to selectively position another bag 150 (e.g., a second bag) at or adjacent to the distal opening 204.

In some examples, the frame member 500 is extendable about one or more frame reels 292. For example, a trail portion 516 of the frame member 500 may be coupled to and extend about a first frame reel 294, a lead portion 518 of the frame member 500 may be coupled to and extend about a second frame reel 296, and a span portion 520 of the frame member 500 may extend between the trail portion 516 and the lead portion 518. In some examples, one or more bags 150 coupled to the frame member 500 are flattened or folded to facilitate extending the frame member 500 about a frame reel 292 (e.g., the first frame reel 294) with the bags 150 coupled thereto.

The first frame reel 294 and/or second frame reel 296 may be rotated to move the frame member 500 from an unused configuration toward a used configuration. In the unused configuration, the trail portion 516 extending about the first frame reel 294 on a first (e.g., upstream) side of the distal opening 204 is larger than the lead portion 518 extending about the second frame reel 296 on a second (e.g., downstream) side of the distal opening 204. A rotational force on the first frame reel 294 urges or forces a segment of the body portion 520 to unreel from the first frame reel 294 such that the segment progresses from the trail portion 516 to the span portion 520. In this manner, a segment of the frame member 500 upstream of the distal opening 204 (e.g., an edge portion 504 coupled to an unused bag 150) may be selectively moved toward the distal opening 204 as the first frame reel 294 is rotated.

Additionally or alternatively, a rotational force on the second frame reel 296 may reel the segment toward the second frame reel 296 to increase a tension or tautness of the segment. Moreover, the rotational force on the second frame reel 296 may reel another segment of the body portion 520 downstream of the segment onto the second frame reel 296 such that the other segment progresses from the span portion 520 to the lead portion 518. In this manner, a segment of the frame member 500 at or downstream of the distal opening 204 (e.g., an edge portion 504 not coupled to a bag 150) may be selectively moved away the distal opening 204 as the second frame reel 296 is rotated. As the first frame reel 294 and second frame reel 296 are rotated, the trail portion 516 decreases in size such that the trail portion 516 is smaller in the used configuration than in the unused configuration, and the lead portion 518 increases in size such that the lead portion 518 is larger in the used configuration than in the unused configuration.

Figure 6:
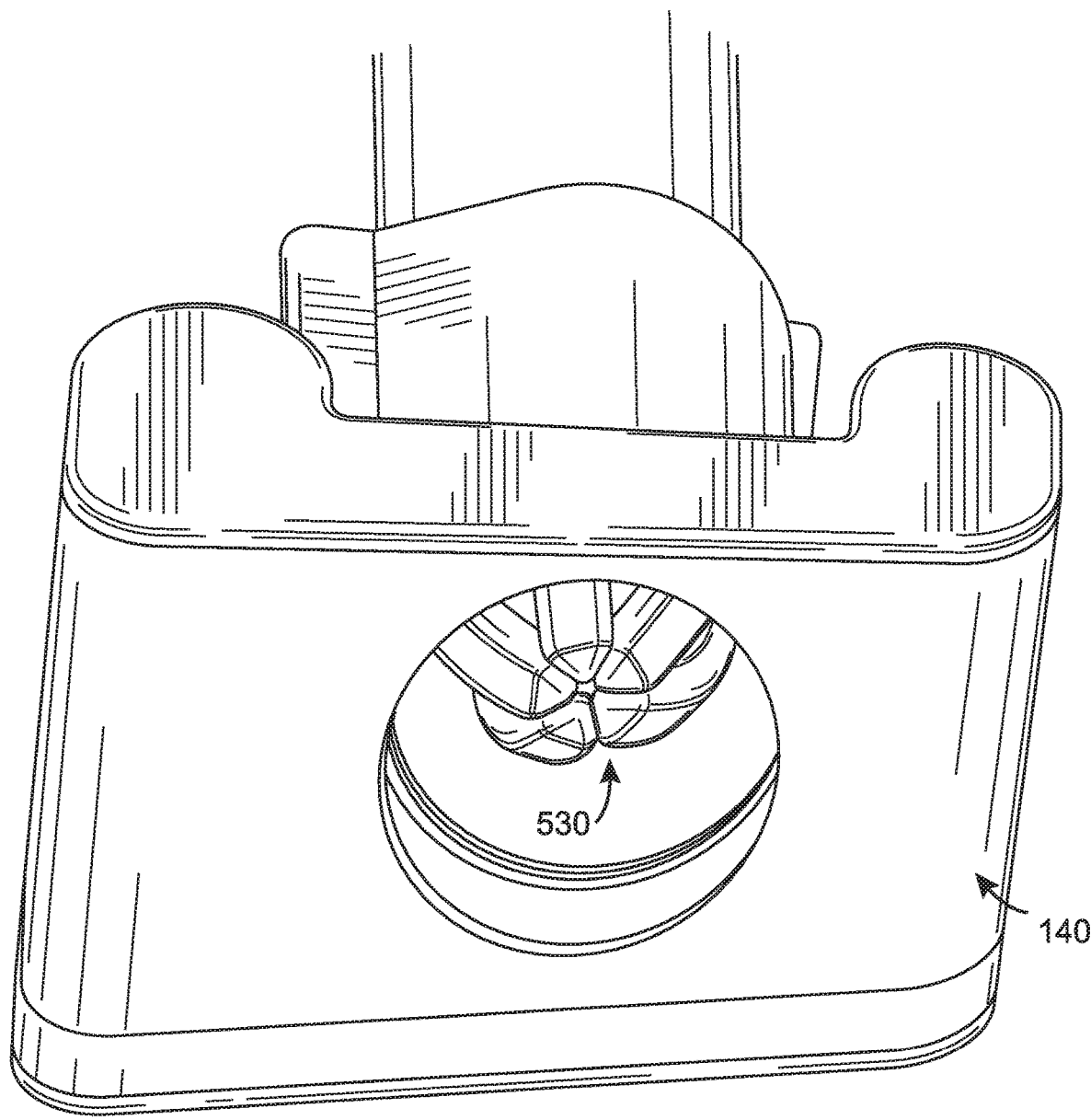
FIG. 6 is a partial sectional view of an example bag assembly that may be used with an animal feces removal device, such as the animal feces removal device shown in FIG. 1.
Figure 7:
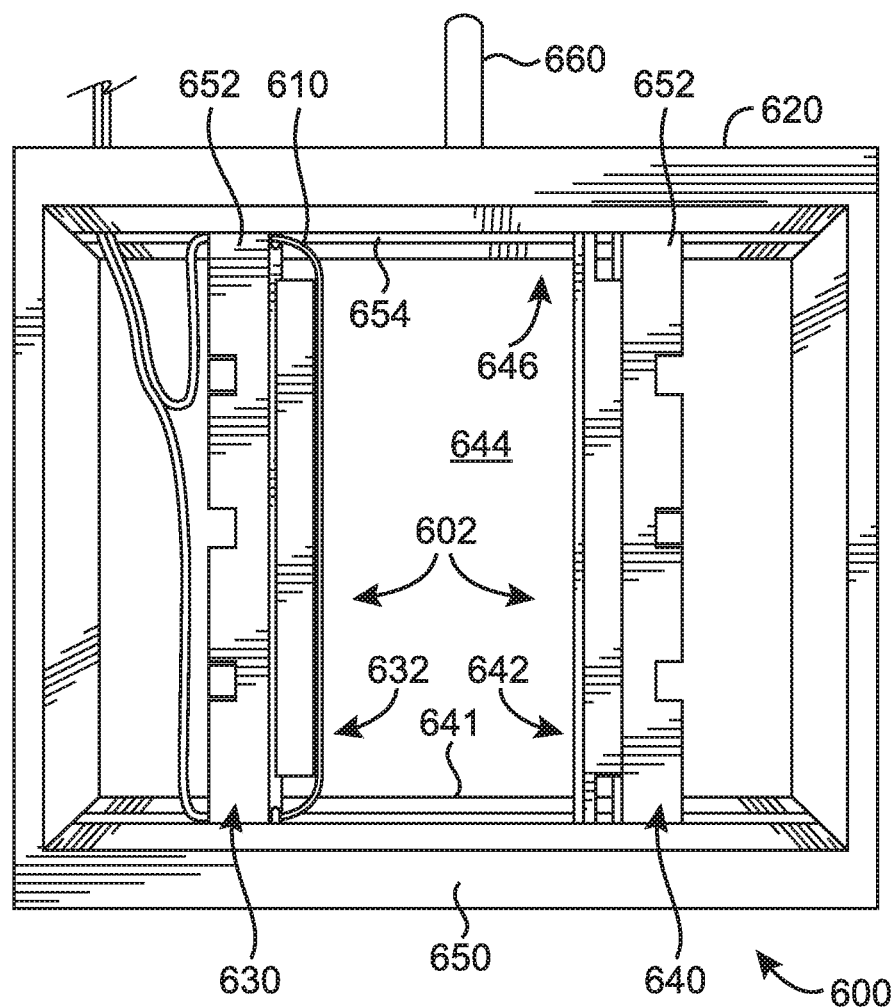
FIG. 7 is an end view of an example seal assembly that may be used with a bag assembly, such as the bag assembly shown in FIG. 6.

FIG. 6 shows the bag assembly 140. FIG. 7 shows a seal assembly 600 that is housed in the bag assembly 140. The seal assembly 600 may be used, for example, to seal an object (e.g., a bag 150). The seal assembly 600 is configured to pinch or come into a portion of an object (e.g., a portion of the bag 150 extending through the frame opening 508) for sealing the object. The seal assembly 600 includes one or more surfaces 602 configured to pinch or come into contact with a portion of an object (e.g., a portion of the bag 150 extending through the frame opening 508), and a heat element 610 configured to transmit heat. The heat element 610 may, for example, come into direct contact with the portion of the object and/or increase a temperature of at least one surface 602 that pinches the portion of the object such that at least the portion of the object is melted.

In some examples, the seal assembly 600 includes a seal frame 620, a first bar 630 including a first surface 632 of the surfaces 602, and a second bar 640 including a second surface 642 of the surfaces 602. The seal frame 620 may be positioned, for example, such that a seal opening 644 defined by an inner surface 646 of a sidewall 650 of the seal frame 620 is generally aligned with the distal opening 204 of the claw housing 110 (e.g., the distal opening 204 and seal opening 644 are coaxially aligned with the longitudinal axis 102). In this manner, a portion of the bag 150 restricted from moving through the frame opening 508 may extend through the seal opening 644.

The first bar 630 and/or second bar 640 are slidably coupled to the seal frame 620. End portions 652 of the first bar 630 and/or second bar 640, for example, may fit in and/or slide along a channel 654 defined by the inner surface 646 of the sidewall 650 to move between a closed position and an open position. In some examples, the seal assembly 600 includes a seal actuator configured to move the first bar 630 and/or second bar 640 between the closed position and the open position. The seal actuator may rotate, for example, one or more gear pins 660 that rotate one or more frame gears 656 to move the first bar 630 and/or second bar 640 between the closed position and the open position. In the closed position, the first surface 632 is generally at or adjacent to the second surface 642 such that the first surface 632 and/or second surface 642 are configured to pinch or come into contact with a portion of an object (e.g., a portion of the bag 150 extending through the frame opening 508). In the open configuration, the first surface 632 is spaced from the second surface 642 for receiving and/or releasing an object.

Figure 8:
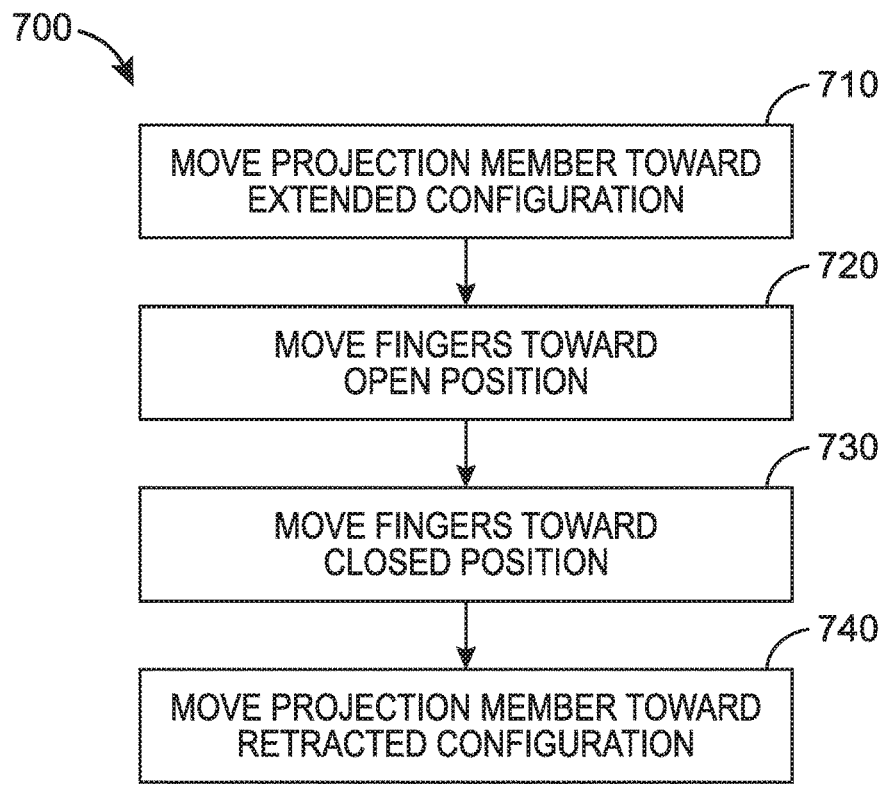
FIG. 8 is a flowchart of an example method for handling an object using an animal feces removal device, such as the animal feces removal device shown in FIG. 1.

FIG. 8 is a flowchart of an example method 700 for handling an object (e.g., animal feces) using an animal feces removal device 100. The method 700 may be implemented, for example, by a control system 170. A distal end 106 of the animal feces removal device 100 may be oriented towards the object when, at operation 710, a projection member 280 is moved toward an extended configuration. The projection member 280 is coupled to a claw assembly 220 such that the fingers 240 of the claw assembly 220 move toward an extended position as the projection member 280 is moved toward the extended configuration. Moreover, as the fingers 240 are moved toward the extended position, the fingers 240 push a bag 150 in a distal direction such that the bag 150 detaches or uncouples from a frame member 500 and is ready for use.

At operation 720, the fingers 240 are moved toward an open configuration. With the fingers 240 in the open position, the bag 150 may be positioned proximate to the object such that the bag 150 at least partially surrounds the object. At operation 730, the fingers 240 are moved toward a closed position such that the bag 150 converges on the object for controlling the object. With the object in control, the object and the bag 150 in which the object is contained may be transported using the animal feces removal device 100. At operation 740, the projection member 280 is moved toward a retracted configuration such that the fingers 240 move toward a retracted position. Upon determining that the fingers 240 are in the retracted position, one or more surfaces 602 of a seal assembly 600 are moved toward a closed position to seal the bag 150 with the object contained therein. For example, the surfaces 602 may be moved toward a closed position such that the surfaces 602 converge on and are proximate to a portion of the bag 150 (e.g., a mouth portion 502 or a neck portion of the bag 150), and a heat element 610 of the seal assembly 600 may be activated to seal the bag 150 by melting the portion of the bag 150. Sealing the bag 150 allows the object to be disposed in a more-sanitary manner. The fingers 240 may be moved toward the open configuration to release or dispose the bag 150 with the object sealed therein (e.g., a first bag). Upon disposing the bag 150 with the object sealed therein, at least a segment of the frame member 500 may be moved to selectively position another bag 150 (e.g., a second bag) coupled to the frame member 500.

Figure 9:
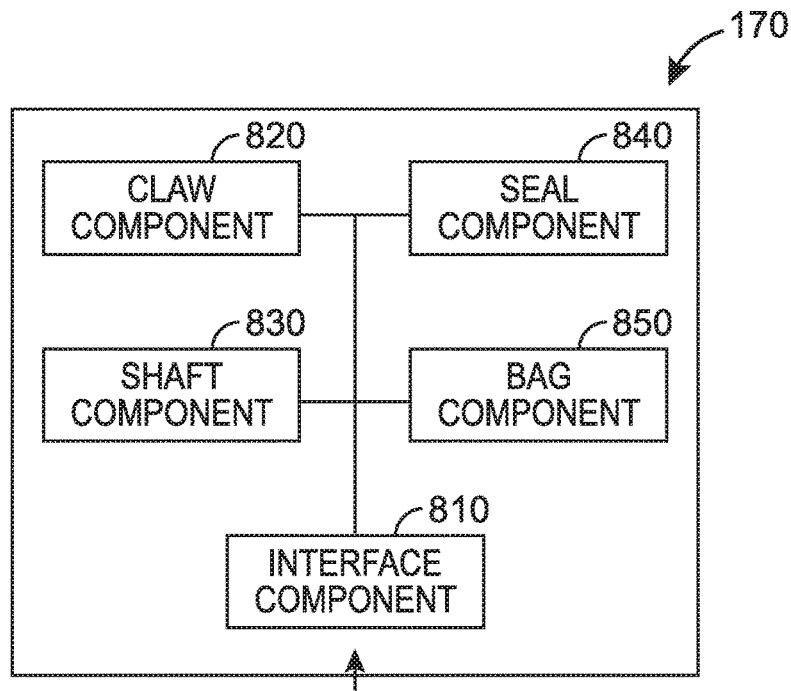
FIG. 9 is a block diagram illustrating an example control system for removing animal feces using an animal feces removal device, such as the animal feces removal device shown in FIG. 1.

FIG. 9 is a block diagram illustrating an example control system 170 that may be used to remove animal feces using an animal feces removal device 100. The control system 170 includes an interface component 810, a claw component 820, a shaft component 830, a seal component 840, and/or a bag component 850. The interface component 810 facilitates communication between and among software components, computer hardware, peripheral devices, and/or users. The interface component 810 may allow, for example, the claw component 820, shaft component 830, seal component 840, and/or bag component 850 to exchange information with each other.

The claw component 820 controls one or more operations of a claw assembly 220. The interface component 810 may allow the claw component 820 to communicate with a claw actuator 250 for selectively moving one or more fingers 240 toward an open configuration (e.g., from a closed configuration) and/or toward the closed configuration (e.g., from the open configuration). The claw component 820 may transmit, for example, one or more instructions to move the fingers 240. In some examples, the claw component 820 determines whether the fingers 240 are in a retracted position.

The shaft component 830 controls one or more operations of a shaft assembly 270. The interface component 810 may allow the shaft component 830 to communicate with a shaft actuator 410 for selectively moving a projection member 280 toward a retracted configuration (e.g., from an extended configuration) and/or toward the extended configuration (e.g., from the retracted configuration). The shaft component 830 may transmit, for example, one or more instructions to rotate a projection reel 420 for moving the projection member 280.

The seal component 840 controls one or more operations of a seal assembly 600. The interface component 810 may allow the seal component 840 to communicate with one or more seal actuators for selectively moving a first surface 630 of a first bar 630 and/or a second surface 640 of a second bar 640 toward a closed configuration (e.g., from an open configuration) and/or toward the open configuration (e.g., from the closed configuration). The seal component 840 may transmit, for example, one or more instructions to rotate one or more frame gears 656 for moving the first bar 630 and/or second bar 640. In some examples, the seal component 840 activates a heat element 610.

The bag component 850 controls one or more operations of a bag assembly 140. The interface component 810 may allow the bag component 850 to communicate with one or more bag actuators 298 for selectively positioning one or more bags 150 adjacent to a distal opening 204. The bag component 850 may transmit, for example, one or more instructions to rotate one or more frame reels 292 for moving at least a segment of a frame member 500 coupled to one or more bags 150.

In some examples, the interface component 810 enables the control system 170 to receive data from and/or present data to a user. The interface component 810 may communicate, for example, with a user interface 180 that allows the user to enter one or more commands and/or provide information to the control system 170. In this manner, the interface component 810 may facilitate communication between the user and the claw component 820, shaft component 830, seal component 840, and/or bag component 850.

Figure 10:
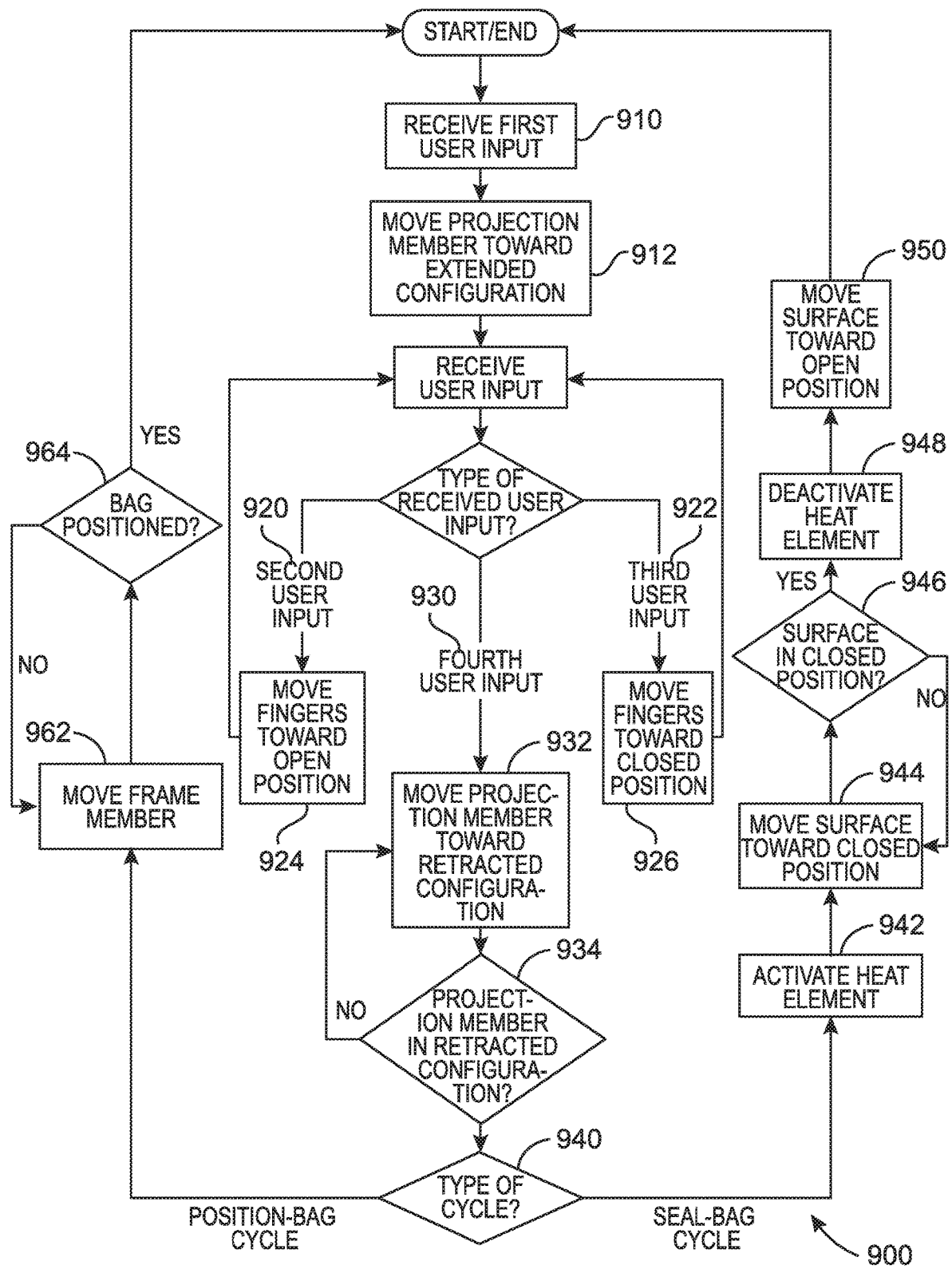
FIG. 10 is a flowchart of an example method that may be implemented utilizing a control system, such as the control system shown in FIG. 9.

FIG. 10 is a flowchart of an example method 900 that may be implemented utilizing a control system 170. In some examples, the control system 170 receives, via user interface 180, user input (e.g., a first user input) at operation 910. For example, the user may move a switch in a distal direction to provide the first user input. In response to the first user input, the control system 170 transmits an instruction to move a projection member 280 toward the extended configuration at operation 912. The projection member 280 may move toward the extended configuration for a predetermined extend distance and/or for a predetermined extend time period.

When the projection member 280 is not in a retracted configuration (e.g., in the extended configuration), the control system 170 may receive, via user interface 180, user input (e.g., a second user input) at operation 920 and/or another user input (e.g., a third user input) at operation 922. For example, the user may move the switch in a leftward direction to provide the second user input and in a rightward direction to provide the third user input. In response to the second user input, the control system 170 transmits an instruction to move one or more fingers 240 toward an open position at operation 924 and, in response to the third user input, the control system 170 transmits an instruction to move one or more fingers 240 toward a closed position at operation 926. The fingers 240 may move toward the open position for a predetermined open distance and/or for a predetermined open time period, and/or toward the closed position for a predetermined close distance and/or for a predetermined close time period.

When the projection member 280 is not in a retracted configuration (e.g., in the extended configuration), the control system 170 may also receive, via user interface 180, user input (e.g., a fourth user input) at operation 930. For example, the user may move the switch in a proximal direction to provide the fourth user input. In response to the fourth user input, the control system 170 transmits an instruction to move the projection member 280 toward the retracted configuration at operation 932. The projection member 280 may move toward the retracted configuration until the fingers 240 are in the retracted position or in a position distal to the retracted position. For example, a restriction or lock mechanism may restrict or inhibit the projection member 280 from moving toward the retracted configuration when the fingers 240 are not in the closed position (e.g., in the open position). If, for example, the projection member 280 is determined to be not in the retracted configuration at operation 934, then the control system 170 may transmit an instruction to move the projection member 280 toward the retracted configuration at operation 932. Additionally or alternatively, the projection member 280 may move toward the retracted configuration for a predetermined retract distance and/or for a predetermined retract time period.

Upon identifying that the projection member 280 is in the retracted configuration (e.g., after operation 932, at operation 934), the control system 170 may determine whether initiate a seal-bag cycle or a position-bag cycle at operation 940. The control system 170 may alternate, for example, between the two cycles. Alternatively, the control system 170 may initiate a cycle based on sensor input (e.g., via sensor system 300) or user input (e.g., via user interface 180).

During the seal-bag cycle, the control system 170 may transmit an instruction to activate the heat element 610 at operation 942 and/or an instruction to move the first surface 630 and/or second surface 640 toward a closed position at operation 944. The control system 170 may utilize the sensor system 300, for example, to identify that the first surface 630 and/or second surface 640 is in the closed position. If, for example, the first surface 630 and/or second surface 640 is determined to not be in the closed position at operation 946, then the control system 170 may transmit an instruction to move the first surface 630 and/or second surface 640 toward the closed position at operation 944. Additionally or alternatively, the control system 170 may receive, via user interface 180, user input associated with activating the heat element 610 and/or moving the first surface 630 and/or second surface 640 toward the closed position. In some examples, the heat element 610 is activated and/or the first surface 630 and/or second surface 640 is maintained in the closed position for a predetermined seal time period.

Upon identifying that the first surface 630 and/or second surface 640 is in the closed position (e.g., after operation 944, at operation 946), the control system 170 may transmit an instruction to deactivate the heat element 610 at operation 948 and/or an instruction to move the first surface 630 and/or second surface 640 toward an open position at operation 950. The control system 170 may utilize a sensor system (e.g., sensor system 300) to identify that the first surface 630 and/or second surface 640 is in the closed position. Additionally or alternatively, the control system 170 may receive, via user interface 180, user input associated with moving the first surface 630 and/or second surface 640 toward the open position. In some examples, the control system 170 identifies a completion of the seal-bag cycle and notes that, upon identifying that the projection member 280 is in the retracted configuration (e.g., after operation 932, at operation 934), the position-bag cycle is to be initiated.

During the position-bag cycle, the control system 170 may transmit an instruction to move the frame member 500 at operation 962. The control system 170 may utilize a sensor system (e.g., sensor system 300), for example, to identify that a bag 150 coupled to the frame member 500 is positioned adjacent to the distal opening 204. If, for example, a bag 150 is determined to not be in a desired position at operation 964, then the control system 170 may transmit an instruction to selectively position the bag 150 by moving the frame member 500 at operation 962. Additionally or alternatively, the control system 170 may receive, via user interface 180, user input associated with positioning one or more bags 150. In some examples, the control system 170 identifies a completion of the position-bag cycle and notes that, upon identifying that the projection member 280 is in the retracted configuration (e.g., after operation 932, at operation 934), the seal-bag cycle is to be initiated.

Figure 11:
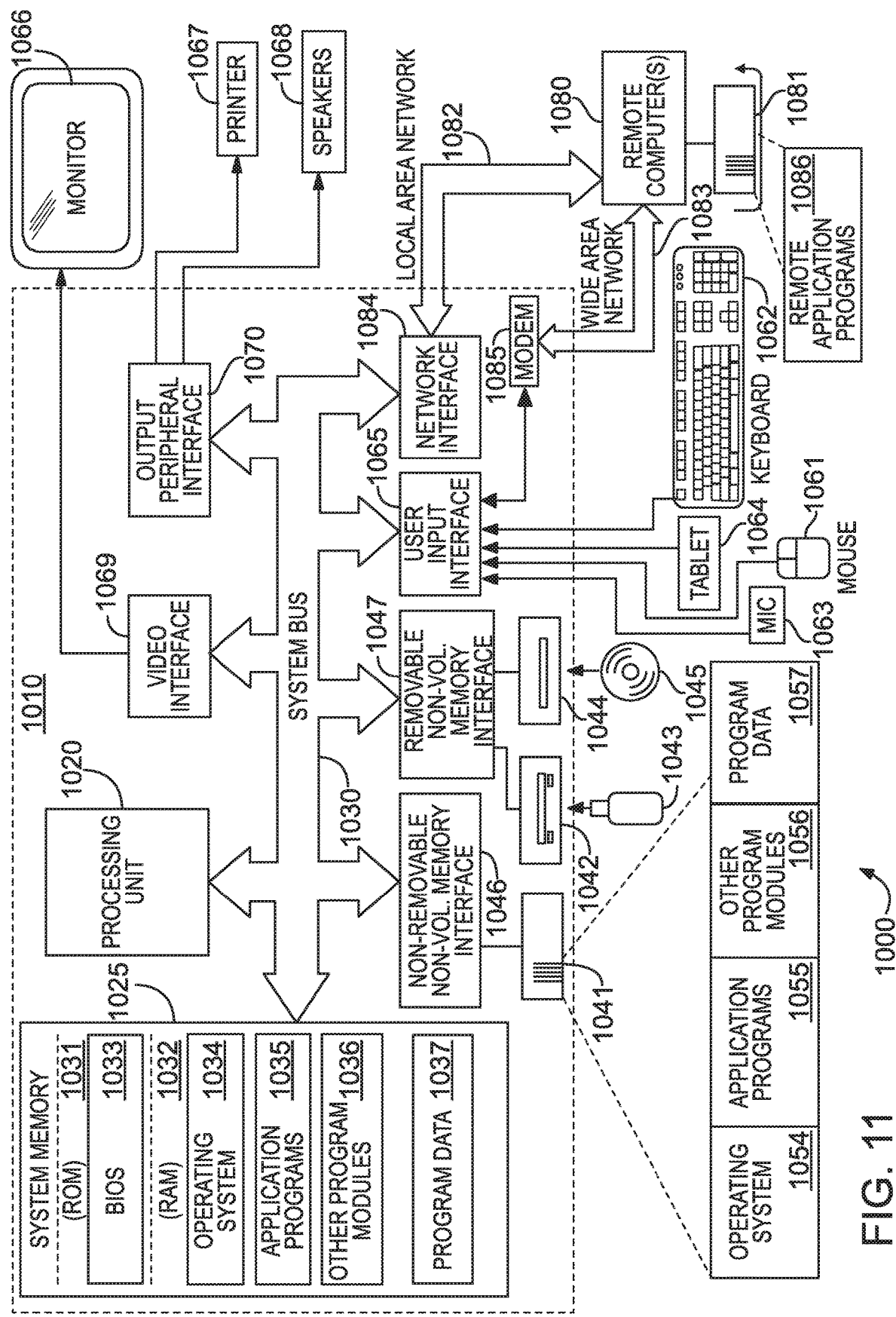
FIG. 11 is a block diagram illustrating an example operating environment that may be used to operate a control system, such as the control system shown in FIG. 9.

FIG. 11 shows an example operating environment 1000 that may be used to enable an animal feces removal device 100 to perform one or more operations. The operating environment 1000 is only one example of a computing and networking environment and is not intended to suggest any limitation as to the scope of use or functionality of the disclosure. The operating environment 1000 should not be interpreted as having any dependency or requirement relating to any one or combination of components illustrated in the example operating environment 1000.

The disclosure is operational with numerous other computing and networking environments or configurations. While some embodiments of the disclosure are illustrated and described herein with reference to the operating environment 1000 being or including a control system 170 (shown in FIG. 9), aspects of the disclosure are operable with any computing system that executes instructions to implement the operations and functionality associated with the operating environment 1000.

For example, the operating environment 1000 may include a mobile device, a tablet, a laptop computer, a desktop computer, a server computer, a microprocessor-based system, a multiprocessor system, a communication devices in a wearable or accessory form factor (e.g., a watch, glasses, a headset, earphones, and the like), programmable consumer electronics, a portable media player, a gaming console, a set top box, a kiosk, a tabletop device, an industrial control device, a minicomputer, a mainframe computer, a network computer, a distributed computing environment that includes any of the above systems or devices, and the like. The operating environment 1000 may represent a group of processing units or other computing systems. Additionally, any computing system described herein may be configured to perform any operation described herein including one or more operations described herein as being performed by another computing system.

With reference to FIG. 11, an example system for implementing various aspects of the disclosure may include a general purpose computing system in the form of a computer 1010. Components of the computer 1010 may include, but are not limited to, a processing unit 1020 (e.g., a processor), a system memory 1025 (e.g., a computer-readable storage device), and a system bus 1030 that couples various system components including the system memory 1025 to the processing unit 1020. The system bus 1030 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 1025 includes any quantity of media associated with or accessible by the processing unit 1020. For example, the system memory 1025 may include computer storage media in the form of volatile and/or nonvolatile memory, such as read only memory (ROM) 1031 and random access memory (RAM) 1032. The ROM 1031 may store a basic input/output system (BIOS) 1033 that facilitates transferring information between elements within computer 1010, such as during start-up. The RAM 1032 may contain data and/or program modules that are immediately accessible to and/or presently being operated on by processing unit 1020. For example, the system memory 1025 may store computer-executable instructions, product data, application data, identifier data, profile data, usage data, location data, and other data. By way of example, and not limitation, FIG. 11 illustrates operating system 1034, application programs 1035, other program modules 1036, and program data 1037.

The computer 1010 includes a variety of computer-readable media. Computer-readable media may be any available media that may be accessed by the computer 1010 and includes both volatile and nonvolatile media, and removable and non-removable media. By way of example, and not limitation, computer-readable media may comprise computer storage media and communication media. Computer storage media are tangible and mutually exclusive to communication media.

Computer storage media includes volatile and nonvolatile, removable and non-removable media implemented in any method or technology, such as semiconductor, magnetic, or optical technologies, for storage of information, such as computer-executable instructions, data structures, program modules or other data. Example computer storage media includes, but is not limited to, ROM 1031, RAM 1032, electrically erasable programmable read-only memory (EEPROM), solid-state memory, flash memory, a hard disk, magnetic storage, floppy disk, magnetic tape, a compact disc (CD), a digital versatile disc (DVD), a BLU-RAY DISC® brand optical disc, an ultra density optical (UDO) disc, or any other medium which may be used to store the desired information and which may be accessed by the computer 1010. (BLU-RAY DISC® is a registered trademark of Blu-ray Disc Association located in Burbank, Calif.). Computer storage media are implemented in hardware and exclude carrier waves and propagated signals. Computer storage media for purposes of this disclosure are not signals per se.

Communication media typically embodies computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

By way of example only, FIG. 11 illustrates a hard disk drive 1041 that reads from or writes to non-removable, nonvolatile magnetic media, a universal serial bus (USB) port 1042 that reads from or writes to a removable, non-volatile memory 1043, and an optical disk drive 1044 that reads from or writes to a removable, nonvolatile optical disk 1045. Other removable/non-removable, volatile/nonvolatile computer storage media that may be used in the example operating environment include, but are not limited to, solid state memory, flash memory, and the like. The hard disk drive 1041 may be connected to the system bus 1030 through a non-removable memory interface such as interface 1046, and magnetic disk drive 1042 and optical disk drive 1044 may be connected to the system bus 1030 by a removable memory interface, such as interface 1047.

The drives and their associated computer storage media, described above and illustrated in FIG. 11, provide storage of computer-executable instructions, data structures, program modules, components (e.g., interface component 810, claw component 820, shaft component 830, seal component 840, bag component 850), applications, and other data for the computer 1010. In FIG. 11, for example, hard disk drive 1041 is illustrated as storing operating system 1054, application programs 1055, other program modules 1056 and program data 1057. Note that these components may either be the same as or different from operating system 1034, application programs 1035, other program modules 1036, and program data 1037. Operating system 1054, application programs 1055, other program modules 1056, and program data 1057 are given different numbers herein to illustrate that, at a minimum, they are different copies.

The processing unit 1020 includes any quantity of processing units, and the instructions may be performed by the processing unit 1020 or by multiple processors within the operating environment 1000 or performed by a processor external to the operating environment 1000. The processing unit 1020 may be programmed to execute the computer-executable instructions for implementing aspects of the disclosure, such as those illustrated in the figures (e.g., FIGS. 8 and 10). For example, the processing unit 1020 may execute an interface component 810 (shown in FIG. 9), a claw component 820 (shown in FIG. 9), a shaft component 830 (shown in FIG. 9), a seal component 840 (shown in FIG. 9), and/or a bag component 850 (shown in FIG. 9) for implementing aspects of the disclosure.

Upon programming or execution of these components, the operating environment 1000 and/or processing unit 1020 is transformed into a special purpose microprocessor or machine. For example, the shaft component 830, when executed by the processing unit 1020, causes the computer 1010 to rotate a projection reel 420 in a first direction to move a projection member 280 toward an extended configuration, and rotate the projection reel 420 in a second direction to move the projection member 280 toward a retracted configuration; and/or the claw component 820, when executed by the processing unit 1020, causes the computer 1010 to move a plurality of fingers 240 toward an open configuration and/or toward a closed configuration. Although the processing unit 1020 is shown separate from the system memory 1025, embodiments of the disclosure contemplate that the system memory 1025 may be onboard the processing unit 1020 such as in some embedded systems.

A user may enter commands and information into the computer 1010 through one or more input devices, such as a pointing device 1061 (e.g., mouse, trackball, touch pad), a keyboard 1062, a microphone 1063, and/or an electronic digitizer 1064 (e.g., on a touchscreen). Other input devices not shown in FIG. 11 may include a joystick, a game pad, a controller, a camera, a scanner, an accelerometer, a satellite dish, or the like. The computer 1010 may accept input from the user in any way, including from input devices, via gesture input, via proximity input (such as by hovering), and/or via voice input. These and other input devices may be coupled to the processing unit 1020 through a user input interface 1065 that is coupled to the system bus 1030, but may be connected by other interface and bus structures, such as a parallel port, game port or the USB port 1042.

Information, such as text, images, audio, video, graphics, alerts, and the like, may be presented to a user via one or more presentation devices, such as a monitor 1066, a printer 1067, and/or a speaker 1068. Other presentation devices not shown in FIG. 11 may include a projector, a vibrating component, or the like. These and other presentation devices may be coupled to the processing unit 1020 through a video interface 1069 (e.g., for a monitor 1066 or a projector) and/or an output peripheral interface 1070 (e.g., for a printer 1067, a speaker 1068, and/or a vibration component) that are coupled to the system bus 1030, but may be connected by other interface and bus structures, such as a parallel port, game port or the USB port 1042. In some embodiments, the presentation device is integrated with an input device configured to receive information from the user (e.g., a capacitive touch-screen panel, a controller including a vibrating component). Note that the monitor 1066 and/or touch screen panel may be physically coupled to a housing in which the computer 1010 is incorporated, such as in a tablet-type personal computer.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 11. The logical connections depicted in FIG. 11 include one or more LANs 1082 and one or more WANs 1083, but may also include other networks. Such networking environments are commonplace in offices, enterprise-wide computer networks, intranets and the Internet.

When used in a LAN networking environment, the computer 1010 is coupled to the LAN 1082 through a network interface or adapter 1084. When used in a WAN networking environment, the computer 1010 may include a modem 1085 or other means for establishing communications over the WAN 1083, such as the Internet. The modem 1085, which may be internal or external, may be connected to the system bus 1030 via the user input interface 1065 or other appropriate mechanism. A wireless networking component including an interface and antenna may be coupled through a device, such as an access point or peer computer to a LAN 1082 or WAN 1083. In a networked environment, program modules depicted relative to the computer 1010, or portions thereof, may be stored in the remote memory storage device. By way of example, and not limitation, FIG. 11 illustrates remote application programs 1086 as residing on memory storage device 1081. It may be appreciated that the network connections shown are examples and other means of establishing a communications link between the computers may be used.

The block diagram of FIG. 11 is merely illustrative of an example system that may be used in connection with one or more examples of the disclosure and is not intended to be limiting in any way. Further, peripherals or components of the computing systems known in the art are not shown, but are operable with aspects of the disclosure. At least a portion of the functionality of the various elements in FIG. 11 may be performed by other elements in FIG. 11, or an entity (e.g., processor, web service, applications, server, computing system, etc.) not shown in FIG. 11.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile devices, tablets, laptop computers, desktop computers, server computers, microprocessor-based systems, multiprocessor systems, programmable consumer electronics, communication devices in wearable or accessory form factors, portable media players, gaming consoles, set top boxes, kiosks, tabletop devices, industrial control devices, minicomputers, mainframe computers, network computers, distributed computing environments that include any of the above systems or devices, and the like.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

The embodiments illustrated and described herein as well as embodiments not specifically described herein but within the scope of aspects of the disclosure constitute example means for picking up, transporting, and/or disposing animal feces. For example, the elements illustrated in FIGS. 1-7, 9, and 11, such as when programmed, encoded, or configured to perform the operations illustrated in FIGS. 8 and 10, constitute at least an example means for moving a projection member 280 toward an extended configuration (e.g., shaft actuator 410, shaft component 830); an example means for moving a plurality of fingers 240 toward an open configuration (e.g., claw actuator 250, claw component 820); an example means for moving the fingers 240 toward a closed configuration (e.g., claw actuator 250, claw component 820); and/or an example means for moving the projection member 280 toward a retracted configuration (e.g., shaft actuator 410, shaft component 830).

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various embodiments with their associated operations, a person skilled in the art would appreciate that a combination of operations from any number of different embodiments is also within the scope of the aspects of the disclosure.

What is claimed is:

1. An animal feces removal device comprising:
a claw housing defining a claw cavity and a distal opening that provides access to the claw cavity;
a claw assembly comprising a plurality of fingers and a claw actuator configured to move the plurality of fingers between a closed configuration and an open configuration, the plurality of fingers positionable within the claw cavity;
a shaft assembly comprising a projection member movable between a retracted configuration and an extended configuration, the projection member coupled to the claw assembly such that the plurality of fingers move between the retracted position and the extended position as the projection member is moved between the retracted configuration and the extended configuration; and
a bag assembly comprising a frame member and one or more bags removably coupled to the frame member, the frame member including a plurality of edge portions defining a plurality of frame openings, a first bag of the one or more bags including a mouth portion coupled to a first edge portion of the plurality of edge portions, the first edge portion moveable relative to the distal opening to selectively position the first bag adjacent to the distal opening such that, when the plurality of fingers move from the retracted position toward the extended position, the first bag is uncoupled from the frame member for use in picking up animal feces.

2. The animal feces removal device of claim 1, further comprising a sensor system configured to detect whether the plurality of fingers are positioned in the retracted position.

3. The animal feces removal device of claim 1 further comprising a control system configured to receive user input and, based on the received user input, move the plurality of fingers toward one of the closed configuration or the open configuration.

4. The animal feces removal device of claim 1 further comprising a control system configured to receive user input and, based on the received user input, move the projection member toward one of the retracted configuration or the extended configuration.

5. The animal feces removal device of claim 1, wherein the shaft assembly comprises a projection reel and a shaft actuator configured to rotate the projection reel, the projection member extendable about the projection reel such that, when the shaft actuator rotates the projection reel in one direction, the projection member moves toward the retracted configuration and, when the shaft actuator rotates the projection reel in another direction, the projection member moves toward the extended configuration.

6. The animal feces removal device of claim 1, wherein the shaft assembly comprises a shaft housing coupled to the claw housing, at least a portion of the shaft housing in the claw cavity.

7. The animal feces removal device of claim 1, further comprising a seal assembly comprising one or more surfaces and a seal actuator configured to move the one or more surfaces between a closed position and an open position.

8. The animal feces removal device of claim 1, further comprising a seal assembly comprising one or more surfaces, a heat element configured to transmit heat, and a seal actuator configured to move one or more of the one or more surfaces or the heat element toward a portion of the first bag such that the heat is transmitted to the portion of the first bag.

9. The animal feces removal device of claim 1 further comprising a control system configured to receive user input and, based on the received user input, move the frame member to selectively position the first bag.

10. The animal feces removal device of claim 1, wherein the bag assembly comprises a frame reel and a bag actuator configured to rotate the frame reel, the frame member extended about the frame reel such that, when the bag actuator rotates the frame reel, a segment of the frame member unreels from the frame reel.

11. The animal feces removal device of claim 1, wherein the bag assembly comprises a frame reel and a bag actuator configured to rotate the frame reel, the frame member extendable about the frame reel such that, when the bag actuator rotates the frame reel, a segment of the frame member reels onto the frame reel.

12. A control system for use in removing animal feces, the control system comprising:
a memory device storing computer-executable instructions; and
a processor configured to execute the computer-executable instructions to:
move a frame member relative to a distal opening defined by a claw housing to selectively position a bag coupled to the frame member, the frame member including a plurality of edge portions defining a plurality of frame openings, the bag including a mouth portion coupled to a first edge portion of the plurality of edge portions;
rotate a projection reel in a first direction to move a projection member extended about the projection reel from a retracted configuration toward an extended configuration, the projection member coupled to a claw assembly such that a plurality of fingers of the claw assembly move from a retracted position toward an extended position as the projection member is moved from the retracted configuration toward the extended configuration;
move the plurality of fingers from a closed configuration toward an open configuration;
move the plurality of fingers from the open configuration toward the closed configuration; and
rotate the projection reel in a second direction opposite the first direction to move the projection member from the extended configuration toward the retracted configuration.

13. The control system of claim 12, wherein the processor is further configured to execute the computer-executable instructions to determine whether the plurality of fingers are in the retracted position.

14. The control system of claim 12, wherein the processor is further configured to execute the computer-executable instructions to rotate one or more frame gears to move one or more surfaces of a seal assembly between a closed position and an open position.

15. The control system of claim 12, wherein the processor is further configured to execute the computer-executable instructions to activate a heat element of a seal assembly.

16. The control system of claim 12, wherein the processor is further configured to execute the computer-executable instructions to rotate one or more frame reels to move the frame member relative to the distal opening.

17. A method for using an animal feces removal device to handle an object, the method comprising:
  moving a frame member relative to a distal opening defined by a claw housing to selectively position a bag coupled to the frame member, the frame member including a plurality of edge portions defining a plurality of frame openings, the bag including a mouth portion coupled to a first edge portion of the plurality of edge portions;
  moving a projection member of a shaft assembly through the distal opening in a first direction and toward an extended configuration, the projection member coupled to a claw assembly such that a plurality of fingers of the claw assembly move toward an extended position as the projection member is moved toward the extended configuration;
  moving the plurality of fingers toward an open configuration, the plurality of fingers movable toward the object in the open configuration to at least partially surround the object;
  moving the plurality of fingers toward a closed configuration to control the object; and
  moving the projection member toward a retracted configuration such that the plurality of fingers move through the distal opening in a second direction and toward a retracted position.

18. The method of claim 17, further comprising:
  determining that the plurality of fingers are in the retracted position; and
  moving one or more surfaces of a seal assembly toward a closed position to seal a bag containing the object.

19. The method of claim 17, further comprising:
  moving one or more surfaces of a seal assembly toward a closed position such that the one or more surfaces are proximate to a portion of a bag containing the object; and
  activating a heat element of a seal assembly to seal the bag containing the object.

* * * * *